United States Patent [19]

Weisend, Jr. et al.

[11] Patent Number: 4,526,031
[45] Date of Patent: Jul. 2, 1985

[54] METHOD AND APPARATUS FOR PROGNOSTICATING POTENTIAL ICE ACCUMULATION ON A SURFACE EXPOSED TO IMPACT ICING

[75] Inventors: Norbert A. Weisend, Jr., Cuyahoga Falls; William A. Beard, Jr., Akron, both of Ohio

[73] Assignee: The B. F. Goodrich Company, Akron, Ohio

[21] Appl. No.: 456,675

[22] Filed: Jan. 10, 1983

[51] Int. Cl.$^3$ .............................................. G01M 9/00
[52] U.S. Cl. ..................................... 73/147; 428/354; 428/478.2; 346/1.1
[58] Field of Search ......................... 346/73, 1.1, 146; 73/432 R, 147; 428/354, 478.2

[56] References Cited

U.S. PATENT DOCUMENTS

| | | | |
|---|---|---|---|
| 2,152,317 | 3/1939 | Kramer | 73/147 |
| 2,440,198 | 4/1948 | Green | 73/147 |
| 3,511,657 | 5/1970 | Smith | 428/478.2 |
| 3,774,225 | 11/1973 | Kimmel et al. | 73/432 R |
| 3,978,734 | 9/1976 | Güsefeld | 73/432 R |
| 4,250,249 | 2/1981 | Montag | 73/147 |
| 4,384,039 | 5/1983 | Opitz et al. | 73/432 R |
| 4,442,148 | 4/1984 | Stierli | 428/478.2 |

Primary Examiner—E. A. Goldberg
Assistant Examiner—A. Evans
Attorney, Agent, or Firm—Joseph Januszkiewicz

[57] ABSTRACT

An article and method for measuring the extent, location and rate of water vapor droplet impingements on various surfaces exposed to multi-dimensional and turbulent flow fields. The article and method are employed in a non-icing atmospheric environment, and the results are used to prognosticate not only the areas where ice would accumulate if the water droplets were supercooled but also the concentration thereof. The invention is accomplished by removably adhering a droplet impingement recorder (10) to a surface to be tested, such as an airfoil (20). The droplet impingement recorder (10) incorporates a water soluble gelatin coating (13) bonded to a substrate (11). Droplets suspended in the flow field impact upon the recording surface (18) of the droplet impingement recorder (10). The recording surface (18) is then microscopically analyzed to determine the size, location and concentration of droplet impingements which information assists one in prognosticating the most effective location for the installation of anti-icing or de-icing equipment.

9 Claims, 6 Drawing Figures

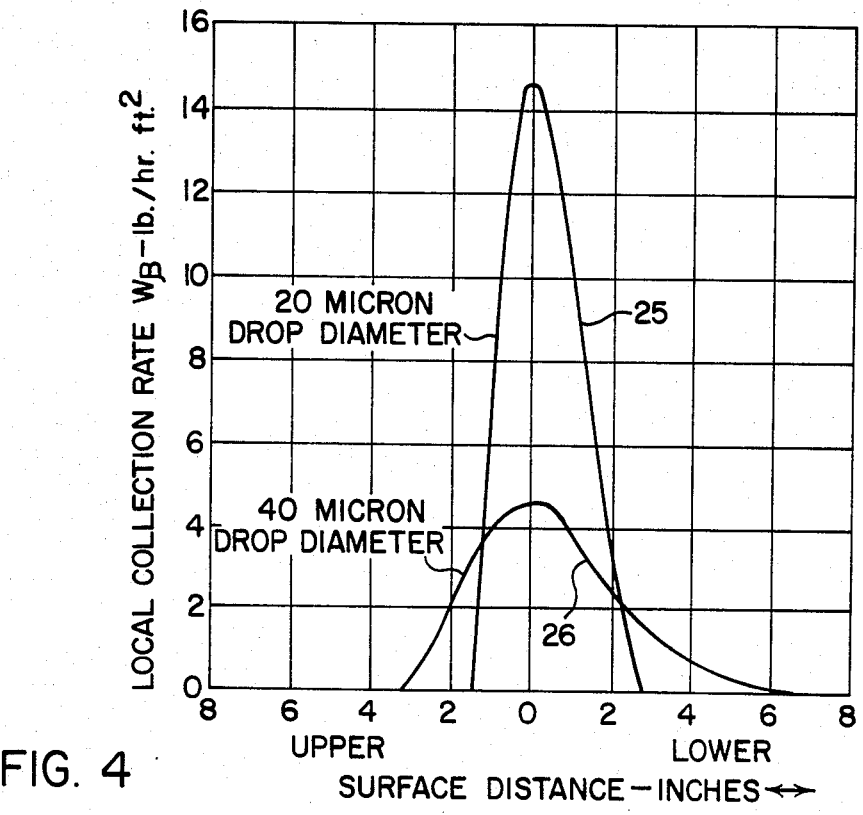
FIG. 4
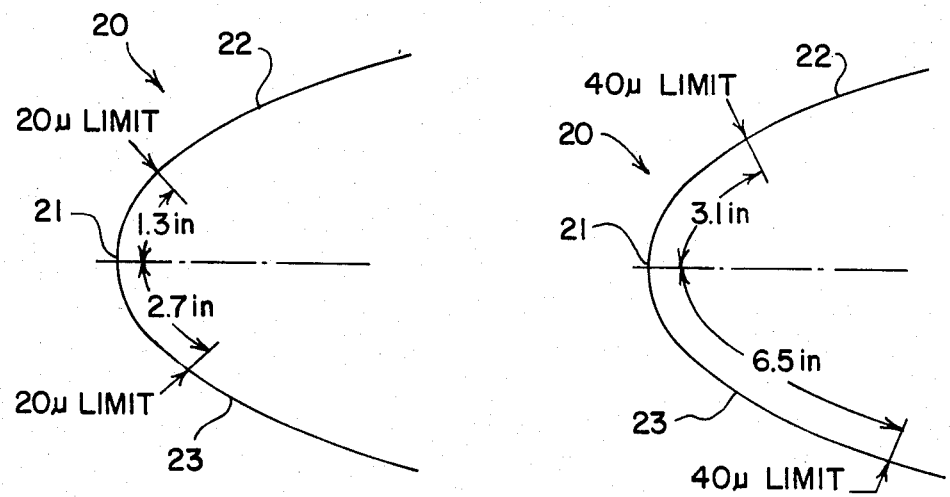
FIG. 5
FIG. 6

METHOD AND APPARATUS FOR PROGNOSTICATING POTENTIAL ICE ACCUMULATION ON A SURFACE EXPOSED TO IMPACT ICING

TECHNICAL FIELD

The present invention relates to a method and apparatus for determining the areas and rates of potential ice accretion on a surface exposed to icing conditions. Icing results when supercooled water vapor impinges upon such surface—typically an airfoil.

The dynamic impact between the supercooled water vapor and the airfoil effects an immediate change in physical state, and the water vapor adheres to the airfoil as ice under proper thermodynamic conditions. With this background knowledge the present inventors were able to extrapolate that it is possible accurately to prognosticate the extent, location and rate of ice accumulation on an airfoil by an empirical determination of where water vapor particles would impinge upon an airfoil as the airfoil is subjected to multidimensional and turbulent airflow fields.

More particularly, then, the present invention relates to a method and apparatus which are capable of determining droplet impingement limits and accretion rates on an airfoil when exposing that airfoil to an atmospheric environment comparable to that in which icing occurs, but at non-icing temperatures, and subsequently ascertaining the location of particle impingement upon the airfoil.

Specifically, the present invention relates to a novel, but safe and relatively uncomplicated, method for determining the surface area of a particular airfoil upon, and along, which icing would likely occur by employing a unique apparatus for directly measuring the droplet size, rate and impingement limits of water vapor particles upon that airfoil under actual flight conditions.

BACKGROUND ART

Aviation has become the major form of transportation in today's world. Airplanes and helicopters are now the predominant means of travel for a substantial sector of our society, and the use of aircraft by commercial carriers to transport mail, business documents, parcels and critical goods has proliferated.

As reliance upon air transportation increases, pilots are called upon to fly their aircraft under a wide variety of weather conditions. Because aircraft performance is highly dependent upon the atmospheric conditions at the time of the flight, unfavorable or even dangerous conditions may be experienced.

One of the most dangerous conditions to which pilots are exposed is the accumulation of ice on the various surfaces of the aircraft. Carburetor and induction icing can suffocate a reciprocating engine, and icing at the intake of a jet engine can markedly reduce the power available. The build-up of ice on the airfoils which sustain flight have an adverse affect that compounds itself. That is, as ice accumulates on the airfoil it changes the aerodynamic configuration of the airfoil which can reduce the lift and increase the drag. At the same time the accumulated ice increases the weight which the airfoil must support. To sustain flight under these conditions the engine(s) must produce more and more thrust, an interim solution which reduces engine life and consumes considerable fuel. Eventually, severe ice accretion will prevent the aircraft from maintaining altitude, and it can only be hoped that the airfoil will continue to produce enough lift to permit a controlled descent until a forced landing can be safely completed. The chances for safely concluding such a flight without adequate means to prevent, or remove, ice accretion are recognized as being minimal.

An accretion of ice on the propeller of an airplane or the rotors of a helicopter similarly reduces the aerodynamic lift—i.e., thrust—provided by those components, again seriously degrading the expected flight characteristics. In addition, it should be noted that if the ice forms unevenly, or should, for some reason, the accumulated ice happen to be thrown, or be removed in whole or in part, from one blade only, the imbalance so created can result in such severe vibrations that: the propellor, or rotor, can itself be destroyed; the engine can be torn from its mounts; or, any component in the drive train from the engine to the propellor, or rotor, can fail.

For these reasons federal regulations require that an aircraft be specially certified to fly into known icing conditions. That is, the aircraft must be equipped with satisfactory means to obviate disastrous ice accretion while the aircraft is in flight.

To combat the effects of ice, aircraft manufacturers have developed various methods either to prevent the formation of ice or to limit and control the ice accumulated. These methods include pneumatic de-icers, which dislodge accumulated ice, alcohol sprays, which prevent formation of ice (an anti-icer), and electrical heating elements which serve as both anti-icers and de-icers.

The problem which faces aircraft manufacturers is where, and how much, de-icing equipment should be installed. If too little equipment is installed, or even if the proper amount of equipment is installed but not in the proper areas, the equipment will be ineffective in preventing or removing ice accumulation. On the other hand, if more de-icing equipment is installed than is necessary, the aircraft is penalized with excessive weight and power consumption as well as additional cost.

To date the amount of de-icing equipment to be used, and its location along the airfoil, has been selected on the basis of years of experience and limited empirical data. Typically, a prototype installation is subjected to test flights conducted under artificial and natural icing conditions to determine if adequate protection had been achieved. Such trial and error approaches are generally expensive. If the prototype operates satisfactorily, overdesign is seldom appreciated, and the system will continually penalize the particular aircraft model with unnecessary weight and cost. If the prototype operates unsatisfactorily, one or more modifications must be incorporated in the prototype before satisfactory performance is achieved. Moreover, test flights with unsatisfactory de-icing equipment can easily become a dangerous experience.

It has heretofore been demonstrated that the dimensions of the crater formed by the impingement of a water vapor droplet on a gelatinous surface is, at least within a given range of airspeeds and impact angles, directly related to the size of the water vapor droplet that produced the crater. It has not, however, been heretofore recognized that such knowledge could be applied empirically to determine the icing field limits on complex shapes subjected to laminar and/or turbulent airflow.

DISCLOSURE OF THE INVENTION

It is, therefore, a primary object of the present invention to provide a method and article for determining the water vapor droplet impingement limits and rates on a surface exposed to laminar and/or turbulent flow fields.

It is another object of the present invention to provide an empirical method for accurately determining the water vapor droplet impingement limits and rates on airfoils and other complex shapes subjected to various flow fields as well as an article particularly adapted for effecting said method.

It is a further object of the present invention to provide a safe method and article for prognosticating the location and extent of possible ice accumulation on an airfoil or other complex shape by directly measuring water vapor droplet size and the impingement limits thereof on the airfoil under consideration when it is subjected to various flow fields of the type encountered in actual flight under non-icing conditions.

These and other objects of the invention, as well as the advantage thereof over existing and prior art forms, which will be apparent in view of the following specification, are accomplished by means hereinafter described and claimed.

In general, a method for measuring water vapor droplet impingements according to the concept of the present invention involves removably adhering a gelatin coated strip to the surface to be studied and exposing that surface to a specific flow field containing water vapor for a definite period of time. As each water vapor droplet impacts against the gelatin coating on the strip, a small portion of gelatin is dissolved and redistributed, leaving a crater-like indentation the size of which relates directly to the size of the water vapor droplet that created the indentation. At the termination of the exposure period the gelatin coated strip is removed from the surface, and the gelatin coating is then studied to determine the size, location and concentration (from which rate can be derived) of water vapor droplet impingements. The areas found to be within a specific concentration limit of droplet impingements are the areas where ice would be most likely to accumulate during icing conditions. Therefore, de-icing equipment need only be installed at these areas of droplet impingement for one to be assured that adequate de-icing protection has been attained.

An exemplary embodiment of an article embodying the concept of the present invention is shown by way of example in the accompanying drawings and described in detail, along with the method of the subject invention, without attempting to show all of the various forms and modifications in which the invention might be embodied; the invention being measured by the appended claim and not by the details of the specification.

BRIEF DESCRIPTION OF THE DRAWINGS

FIG. 4 is a graphical representation of the collection rate of water vapor droplets measuring 20 microns in diameter and 40 microns in diameter in relation to the distance rearwardly from the leading edge of the airfoil along the upper and lower surface thereof as determined by a method and article embodying the concept of the present invention, the abscissa representing the distance, in inches, rearwardly from the leading edge and the ordinate representing the collection rate calculated in pounds of ice per hour per square foot upon the surface area upon which ice would accumulate;

FIG. 5 is a schematic chordal cross section through the exemplary airfoil to which the graphical representation of FIG. 4 relates depicting the substantial impingement limits along the upper and lower surface of the airfoil against which 20 micron droplets would impact with sufficient frequency to effect an accumulation of ice; and, FIG. 6 is a schematic chordal cross section through the exemplary airfoil to which the graphical representation of FIG. 4 relates depicting the substantial impingement limits along the upper and lower surface of the airfoil against which 40 micron droplets would impact with sufficient frequency to effect an accumulation of ice.

EXEMPLARY EMBODIMENT FOR CARRYING OUT THE INVENTION

Figure 1:
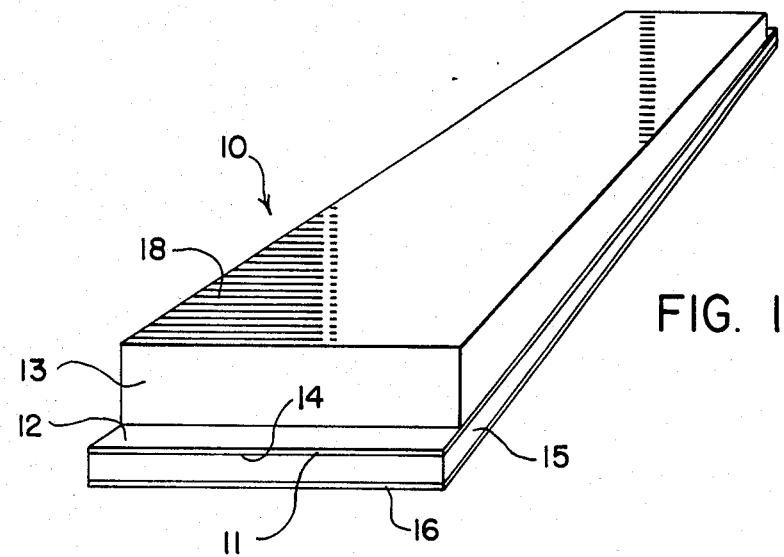
FIG. 1 is an exaggeratedly enlarged perspective schematically depicting an article in the form of a water vapor droplet impingement recorder embodying the concept of the present invention.

An article in the nature of a water vapor droplet impingement recorder embodying the concept of the present invention is indicated generally by the numeral 10 in FIG. 1 of the attached drawings. Basically, the droplet impingement recorder 10 comprises a film substrate 11 one surface 12 of which presents a gelatinous coating 13, and the opposite surface 14 of which presents an adhesive means 15 that remains covered prior to use by a removable protective strip 16.

The substrate 11 can be any flexible, film material having suitable dimensional stability so that it will not readily distort, having sufficient strength so that it will not readily tear and having characteristics which permit the adhesive and gelatinous coatings to be firmly bonded thereto. Double backed, presure sensitive adhesive tape has been found to satisfy the requisite design criteria at minimal cost. The gelatinous coating 13 is secured to surface 12 on the double backed, pressure sensitive tape substrate 11, and the adhesive 15 on surface 14 provides the means by which the assemblage is adhered, as desired, to the surface being studied for potential ice accretion.

Airfoil icing on aircraft is generally the result of supercooled water vapor droplets striking the airfoil. The supercooled droplets freeze on impact and adhere at the point of impingement. The size of the droplets has been found to be a factor in determining the general location where the droplets will impinge upon the surface under consideration. Typically, the smaller droplets will impinge close to the leading edge of the airfoil. The larger droplets can impinge not only in proximity to the leading edge but also at some distance rearwardly thereof. Thus, the size of the droplets is directly related to the location where droplets will impinge and therefore the location of the resultant ice accumulation on the airfoil.

Whether the droplets freeze on impact or simply stream rearwardly in rivulets along the airfoil is solely a function of temperature. Hence, one can study droplet impingement at temperatures above freezing, and if that data is accurately obtained and recorded, one can, with accuracy, prognosticate what will happen when the atmospheric conditions are conducive to actual icing.

In summary, then, the present invention allows one to expose an airfoil to the impingement of water vapor droplets in an atmospheric environment comparable to that in which icing occurs, but at non-icing temperatures, and subsequently to ascertain the location, and size of particle impingement upon the airfoil. This information will delineate, with considerable accuracy, the rate and dimensional limits along the airfoil where icing would be experienced when flying in a comparable atmospheric environment at temperatures conducive to icing.

The droplet impingement recorder 10, then, provides a new and novel article by which to determine the location and size of droplet impingement. The impingement of each droplet imparts a crater-like indentation in exposed surface 18 of the gelatinous coating 13. The location of the indentation records the location of the impingements, and the size of each indentation identifies the size of the droplet impinging at that location, all as hereinafter more fully explained.

To provide an effective droplet impingement recorder 10 the gelatinous coating 13 is formed from a gelatin solution which has been permitted to cure as a thin sheet. The gelatin solution is generally a mixture of gelatin powder, such as the unflavored gelatin sold under the trademark Knox, and distilled water. While the ratio of gelatin powder to distilled water may vary considerably, it has been found that a solution containing a 15 to 20 percent concentration of gelatin powder permits clear resolutions of droplet impingements. Additives can be employed to enhance the resolution qualities of the gelatin coating 13. Such additives may include dye, such as black India ink, to provide an opaque background by which to mask the surface 12 of the substrate 11 and thereby highlight the crater-like indentations created by impingement of the water droplets, and detergent, such as ordinary dishwashing soap, to serve as a wetting agent by which to aid in producing the gelatinous coating 13 as hereinafter more fully described.

An exemplary gelatin coating which has been found to provide a highly satisfactory droplet impingement record can be prepared as follows.

A premeasured quantity, say 16 fluid ounces (approximately 473 ml) of distilled, or deionized, water is heated to a temperature of 180° F.–190° F. (approximately 82° C.–88° C.), and care should be exercised not to exceed the boiling point of the water in order to obviate the inclusion of air bubbles. Gelatin powder in an amount sufficient to gel the quantity of water being used—for 16 fluid ounces (473 ml) of water 0.25 ounces (approximately 7 grams) of Knox brand gelatin powder—is added to the heated water, and the solution is stirred until the gelatin powder is completely dissolved. Approximately 2 drops of a liquid dishwashing detergent and approximately 75 drops of water soluble black, India ink is added to the solution which is then carefully stirred for approximately 1 minute. The solution is removed from the heat and carefully poured through a filter which may consist of perhaps eight (8) plies of cheesecloth to remove any air bubbles, or solids.

The filtered gelatin solution is gently poured into a smooth, flat mold to provide a thin sheet (enhanced by the wetting agent) approximately 0.10 inches (2.54 mm) thick and allowed to gel and dry. The dried gelatin sheet—which might dry to approximately 0.005 inches (0.13 mm) in thickness—is then removed from the mold, inverted, the substrate tape 11 is adhered to the surface of the gelatin sheet which contacted the mold, and the surface of the sheet that was exposed to the atmosphere during the cure will preferably become the impingement, or recording, surface 18.

To elaborate on the foregoing example, a flat surface is selected to constitute the planar form against which the gelatin sheet is to be molded. One might well consider employing a flat plate one foot (approximately 30.5 cm) long by two feet (approximately 61 cm) wide which can be shimmed to present a horizontally level surface.

An adhesive means is applied to the upwardly directed surface of the plate, and a smooth surfaced film such as sold under the trademark Tedlar, or Mylar, may be releasably secured to the upwardly directed surface of the plate to present a smooth, wrinkle free, release means which will allow the gelatinous sheet formed thereon to be freely stripped from the mold.

A containing wall is provided around the periphery of the plate to serve as a "tinker's dam" which will impound the liquid gelatin solution until it gels and thereafter dries. Complete drying normally takes approximately 24 hours and is enhanced if the environment has approximately a sixty percent (60%) relative humidity, or less, at approximately 70° F. (21° C.).

The gelatin sheet so formed is then stripped off the mold, inverted, and a plurality of double backed adhesive strips are applied to the surface of the gelatin sheet which had been in contact with the mold. A typical application would employ a plurality of strips one (1) inch (approximately 2.54 cm) wide applied in parallel succession. The adhesive provided on the double backed tape is normally sufficient to effect the required secure bond between the tape, which forms the substrate 11, and the gelatin sheet 13.

The adjacent, parallel strips of tape are preferably spaced 1/16 to 3/16 of an inch (1.6 mm to 4.5 mm) apart, and, for subsequent ease of handling, both ends of the tape are permitted to extend approximately one (1) inch (2.54 cm) beyond the end of the gelatin sheet 13. The gelatin sheet is then severed parallel to, and between each of, the tape strips, and the excess gelatin is then trimmed away to the edge of the strip. Care must be exercised not to touch the smooth recording surface 18 of the gelatin, because the normal moisture on the hands and fingers can degrade the smooth surface of the gelatin. A plastic sheet may be wrapped about the aforesaid assemblage which constitutes the droplet impingement recorder 10, and it may then be stored in a dry place until ready for use.

The exemplary process described above would make either a plurality of impingement recorders one (1) inch (2.54 cm) wide and approximately one (1) foot (30.5 cm) long or one (1) inch (2.54 cm) wide and approximately two (2) feet (61 cm) long. However, neither dimension is critical. These are convenient dimensions for such airfoils as aircraft wings or helicopter rotors, but the droplet impingement recorder 10 can be of any size and shape that would allow an adequate amount of recording surface 18 to be exposed to the flow field, the limitations being proscribed only in the ability of the configuration to assume the contour of the surface being tested, and in the ease with which the configuration can be handled without distorting the recording surface.

The recording surface 18 not only records the quantity of droplet impactions in a specific area, but the craters formed by the impaction are indicative of the size of the impacting droplet. Tests have been conducted at Pennsylvania State University upon a gelatin surface similar to that of the present invention in which droplets ranging in size from 1 to 50 microns where impacted against the gelatin surface at flow velocities about 55 miles per hour (approximately 25 meters per second) to about 135 miles per hour (approximately 60 meters per second). These tests clearly demonstrated that the size of the resulting crater was twice the size of the impacting droplet. That is, a 15 micron droplet forms a crater having a diameter of 30 microns upon impaction. Jiusta, James E., "Cloud Particle Sampling," Report #6 NSF G24850, Department of Meteorology, College of Mineral Industries, Pennsylvania State University, June, 1965.

Thus, it should be appreciated that the droplet impingement recorder 10 can be employed to indicate the number of droplets impacted upon a specific test area, the distribution of the droplets upon the test area, and also the size of the droplets impacted. The compilation of this data enables one to prognosticate, with remarkable accuracy, the areas and severity of ice accumulation upon the test surface under icing conditions, as will become more apparent hereinbelow.

The benefits afforded by the present invention can be amply demonstrated by considering the use of an exemplary impingement recorder 10 embodying the concept of the present invention to prognosticate those areas of an airfoil—in the nature of an aircraft wing and a helicopter rotor—upon which icing would tend to accumulate when that airfoil is flown through a particular atmospheric environment.

Numerous tests have empirically substantiated that the size of any particular water vapor droplet entrained in the airflow around an airfoil will determine the maximum distance rearwardly of the leading edge at which the droplet can impinge upon the airfoil—the smaller the droplet, the closer to the leading edge, and, conversely, the larger the droplet, the more remotely from the leading edge that the droplet can strike the airfoil.

Tests have also demonstrated that for an airfoil of uniform cross sectional configuration along its lateral extent the airflow therearound is substantially uniform so that tests at random locations therealong will provide substantially identical results. It has been similarly demonstrated that for an airfoil wherein the cross sectional configuration uniformly changes along the entire, or a portion of the, lateral extent thereof, tests taken at several distinct locations along the lateral extent of the changing airfoil cross section reflect a concomitant transitional flow which corresponds to the changes in airfoil section so that the results of droplet impingement between the stations can be accurately determined by interpolation of the results at the test stations.

Thus, when employing the present invention it is only necessary to determine droplet impingement at several distinct locations along the lateral extent of the airfoil. The data so accumulated will permit determination of droplet impingement along the entire lateral extent of the airfoil, by interpolation.

On this basis, then, one would employ a plurality of recorders 10 spaced laterally along the exemplary airfoil, such as the airplane wing 20 schematically represented in FIGS. 2 and 3, as follows.

Figure 2:
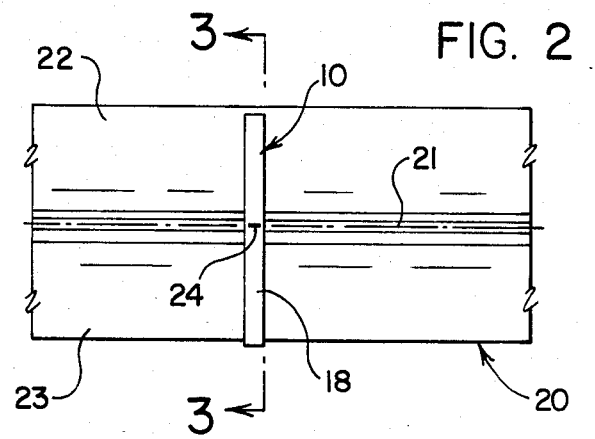
FIG. 2 is a fragmentary, frontal elevation depicting the droplet impingement recorder of FIG. 1 adhered to the leading edge of an airfoil and oriented substantially parallel to the chord of said airfoil.
Figure 3:
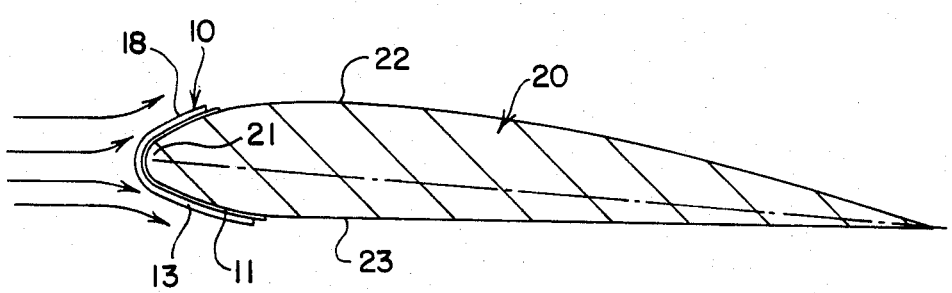
FIG. 3 is a transverse cross section taken substantially along line 3—3 of FIG. 2.

A droplet impingement recorder 10, preferably having a strip-like configuration, is adhesively bonded transversely to the leading edge 21 of the airfoil 20 so as to be oriented generally parallel to the chord of the wing, as illustrated in FIGS. 2 and 3. Preferably the droplet impingement recorder 10 is positioned such that one-third of the recording surface 18 extends in a chordwise direction along the upper surface 22 of the airfoil and the remaining two-thirds extends in a chordwise direction along the lower surface 23 of the airfoil 20. It should be appreciated that each portion of the droplet impingement recorder 10 should extend a sufficient length aft of the leading edge 21 into that region where droplets in the flow field would no longer impinge upon the airfoil 20, thereby assuring that the entire region of droplet impingement is being studied.

With experience one skilled in the art will be capable of anticipating the general region along an airfoil where impingement might be expected to cease for the size of water vapor droplets one would expect to encounter in flight.

Extensive icing tests have shown that the chances of exceeding 37 microns as the maximum droplet diameter in a cumulus cloud is only about 2%, and that the largest droplets occur in maritime cumulus clouds such as those formed over relatively large bodies of water (such as the Great Lakes) in winter.

Thus, to determine the dimensional extent rearwardly of the leading edge on the upper and lower surfaces of a particular airfoil upon which water vapor droplets will impinge, that airfoil should be supplied with a plurality of recorders 10 and then flown into a maritime cumulus cloud at temperatures above freezing. After the aircraft incorporating that particular airfoil lands a leading edge index, or reference, mark 24 is placed on the droplet impingement recorder 10 to indicate the relative location thereof. The droplet impingement recorder 10 is then removed from the airfoil 20 and the recording surface 18 is studied under a microscope, the droplet impingement craters being referenced against the leading edge reference mark 24 to determine where icing would be most likely to occur were the temperatures of the droplets at, or below, freezing. In this way one can prognosticate with considerable accuracy the dimensional extent where icing will occur on the airfoil and therefore the most propitious location for the de-icing equipment to be mounted on that particular airfoil.

For example, when the recorder strips 10 are removed from the airfoil 20, those impingements created by 20 micron droplets can be identified and their location referenced by their distance rearwardly from the leading edge index mark 24. The number of impingements at representative distances can be counted and that number for the time during which the airfoil was exposed to the water vapor environment can be extrapolated to calculate the rate at which the water droplets strike that location, measured, for example, in terms of pounds (or kilograms) of water, or ice, per hour, per square foot (meter) for that representative distance rearwardly of the leading edge 21 on airfoil 20. The 20 micron concentricity for a typical airfoil 20 might well be represented by the curve 25 on FIG. 4. Similarly, the extent and concentration of 40 micron droplets would be reflected by curve 26 in FIG. 4.

Such a distribution would reveal that icing resulting from 20 micron droplets would extend rearwardly along the upper and lower surfaces 22 and 23, respectively, to an extent represented by FIG. 5, and likewise, that icing resulting from 40 micron droplets would extend rearwardly along the upper and lower surfaces 22 and 23, respectively, to an extent represented by FIG. 6.

A comparative study of FIGS. 4, 5 and 6 would reveal that for an airfoil 20, icing equipment sufficient to protect against the accretion of icing which would result from 40 micron droplets would encompass the full extent of icing accretion attendant upon the impingement of 20 micron droplets Hence, based upon the data accumulated by virtue of the present invention, one could prognosticate that the installation of de-icing equipment from 3.1 inches (7.9 cm) rearwardly of the leading edge along the upper surface 22 forwardly to the leading edge 21 and then rearwardly along the lower surface 23 to a point 6.5 inches (16.5 cm) rearwardly of the leading edge 21 should properly serve to protect an aircraft incorporating the airfoil 20 against icing conditions.

It should also be noted that the droplet impingement pattern reflects upon and perhaps delineates the flow field associated with the surface under study. This is particularly emphasized by the indentations formed from the impingement of droplets traveling tangentially of the recording surface 18.

The present invention may also be employed with facility to determine the areas and liklihood of ice accumulation on an airfoil in the nature of a main rotor blade for a helicopter or to a wide variety of other surfaces subjected to impact icing.

When testing a main rotor blade on a helicopter one must bear in mind that the velocity of sequential points along the blade, from the hub to the tip, will vary linearly in proportion to the distance outboard from the hub. As such, it will be imperative to employ a plurality of recorders 10 along the length of the blade in order to obtain results that will reflect the affect of the various speeds Accordingly, it should now be evident that a method and article for determining the droplet impingement limits on an airfoil can be employed accurately to prognosticate the location and extent of potential ice accumulation and otherwise effects the various objects of the invention set forth hereinabove and constitutes an advantageous contribution to the art.

We claim:

1. A water droplet impingement recorder for use on surfaces exposed to an airflow field comprising: a water soluble gelatin coating; a backing means in the form of a substrate having opposed surfaces, one side of which is bonded to said gelatin coating the other side of said backing means being suitable for removably adhering to said airfoil surface.

2. A droplet impingement recorder, as set forth in claim 1, wherein said backing means extends beyond said gelatin coating in at least one selected direction.

3. A droplet impingement recorder, as set forth in claim 1, in which said backing means is double backed, pressure sensitive adhesive tape.

4. A droplet impingement recorder, as set forth in claim 1, in which said water soluble gelatin coating contains a dye to enhance the visual clarity of recorded droplet impingement marks.

5. A droplet impingement recorder, as set forth in claim 4, in which said water soluble gelatin coating is formed from a solution having a gelatin powder concentration in the range of 15 to 20 percent.

6. A method for measuring water vapor droplet impingement on a substantially continuous surface exposed to an airflow field in which water vapor droplets are entrained comprising the steps of:
bonding a water soluble gelatin coating to a substrate;
removably adhering said substrate to the surface so as to present said gelatin coating along the surface;
exposing the surface and gelatin coating adhered thereon to the airflow field for a measured period of time in order to allow droplets entrained in the airflow field the opportunity to impact upon the gelatin coating, thereby creating an impingement mark;
removing the substrate and attached gelatin coating from the surface;
subjecting the gelatin coating to microscopic observation to determine the size, location and concentration of droplet impingements thereon.

7. A method for measuring water vapor droplet impingement, as set forth in claim 6, comprising the further step of calculating the rate of ice accretion as a function of the observed concentration with respect to the time during which the surface of the coating was exposed to the airflow field 8. A method for determining the areas of probable ice accumulation on an airfoil exposed to flight through an atmospheric environment at temperatures above freezing in which water vapor droplets are entrained comprising the steps of:
bonding a water soluble gelatin to one or more tape strips;
removably adhering one or more of said tape strips to the appropriate surfaces on said airfoil;
exposing the airfoil on which said tape strips are adhered to a non-icing atmospheric envirnoment in which water vapor droplets are entrained to allow any water droplets in said non-icing environment to impact upon said gelatin coating on said tape strip thereby creating an impingement mark;
removing said tape strip from said surface;
subjecting the surface of said gelatin coating to microscopic analysis to determine the regions in which the concentration of water droplet impingement is such that ice accretion would result if the water droplets were supercooled.

9. A method for determining the areas of probable ice accumulation on an airfoil, as set forth in claim 8, comprising the further step of exposing the surface of the gelatin coating to the atmospheric environment in which water vapor droplets are entrained for a given period of time.

* * * * *